(12) United States Patent
Shim

(10) Patent No.: US 6,807,399 B1
(45) Date of Patent: Oct. 19, 2004

(54) TRANSMITTING/RECEIVING APPARATUS OF REPEATER SYSTEM

(75) Inventor: Jae Hoon Shim, Ansan (KR)

(73) Assignee: LG Electronics Inc., Seoul (KR)

( * ) Notice: Subject to any disclaimer, the term of this patent is extended or adjusted under 35 U.S.C. 154(b) by 606 days.

(21) Appl. No.: 09/660,413

(22) Filed: Sep. 12, 2000

(30) Foreign Application Priority Data

Sep. 13, 1999 (KR) .............................. 99-39025

(51) Int. Cl.[7] ................................. H04B 7/14

(52) U.S. Cl. ........................ 455/24; 455/126; 370/315

(58) Field of Search ................................ 455/24, 7, 10, 455/13.3, 15, 13.4, 78, 127, 126, 127.2; 370/315, 316, 317, 318, 278, 282, 279, 339, 286, 289; 375/144, 148, 346

(56) References Cited

U.S. PATENT DOCUMENTS

| | | | | |
|---|---|---|---|---|
| 4,317,217 A | * | 2/1982 | Davidson et al. | 455/24 |
| 4,383,331 A | * | 5/1983 | Davidson | 455/24 |
| 4,475,243 A | * | 10/1984 | Batlivala et al. | 455/22 |
| 5,835,848 A | * | 11/1998 | Bi et al. | 455/24 |
| 5,963,847 A | * | 10/1999 | Ito et al. | 455/17 |
| 6,327,312 B1 | * | 12/2001 | Jovanovich et al. | 375/316 |

* cited by examiner

Primary Examiner—Nick Corsaro
(74) Attorney, Agent, or Firm—Fleshner & Kim LLP

(57) ABSTRACT

A transmitting/receiving apparatus of a repeater system in which a signal received by the receiving apparatus from a base station is amplified to a high-powered transmission signal by the transmitting apparatus so as to be transmitted to a destination, wherein the transmitting apparatus varies a phase and a magnitude of the transmission signal and applies a compensation signal to the receiving apparatus, and the receiving apparatus adds the inputted compensation signal and a signal inputted through a receiving antenna and removes an unnecessary frequency component caused due to interference of the transmission signal.

19 Claims, 2 Drawing Sheets

TRANSMITTING/RECEIVING APPARATUS OF REPEATER SYSTEM

BACKGROUND OF THE INVENTION

1. Field of the Invention

The present invention relates to a relay system, and more particularly to a transmitting/receiving apparatus.

2. Description of the Background Art

FIGS. 1 and 2 illustrate a transmitting apparatus 100 and a receiving apparatus 110 of a repeater system.

As shown in FIG. 1, the receiving apparatus 100 of a repeater system includes a receiving antenna 11 for receiving a weak signal propagated from a base station; a band-pass filter 12 for filtering the signal received through the receiving antenna 11; a low noise amplifier 13 for low-noise amplifying the frequency signal (S_Rx) outputted from the band-pass filter 12; and a mixer 14 for mixing the output signal of the low noise amplifier 13 and a local signal (LO) to obtain a downwardly converted intermediate frequency signal (IF_Rx).

As shown in FIG. 2, the transmitting apparatus 110 of the repeater system includes a mixer 21 for mixing the intermediate frequency (IF_Tx) outputted from the receiving apparatus 100 and a local signal (LO) to obtain an upwardly converted radio frequency (RF) signal, a power amplifier 22 for amplifying the radio frequency (RF) signal outputted from the mixer 21; a low-pass filter 23 for removing an unnecessary component from the output signal of the power amplifier 22; and a transmitting antenna 24 for transmitting the transmission signal (S_Tx) outputted from the low-pass filter 23.

The operation of the transmitting and receiving apparatuses 100 and 110 of the repeater system constructed as described above will now be explained.

Generally, a repeater system receives a weak signal through a receiving antenna from the base station, amplifies it to transmission signal with a relatively high power and transmits it through a transmitting antenna.

In detail, in the receiving apparatus of a repeater system, the receiving antenna 11 receives a weak signal propagated from the base station and provides it to the band-pass filter 12, which extracts a frequency signal (S_Rx) existing in a certain range of the received signal. The low-noise amplifier 13 low-noise amplifies the frequency signal (S_Rx) outputted from the band-pass filter 12, and the mixer 14 mixes the local signal (LO) with the output signal of the low-noise amplifier 13 to obtain the downwardly converted intermediate frequency signal (IF_Rx).

Meanwhile, in the transmitting apparatus 110 of the repeater system, the mixer 21 mixes the local signal (LO) with the intermediate frequency (IF_Tx) signal to obtain the upwardly converted radio frequency (RF) signal, and the power amplifier 22 amplifies the radio frequency signal outputted from the mixer 21. The low-pass filter 23 removes the unnecessary component from the output signal of the power amplifier 22 and provides it to the transmitting antenna 234. Then, the transmitting antenna 24 transmits the transmission signal (S_Tx) outputted from the low-pass filter 23 toward a destination.

However, as for the conventional repeater system, since the weak signal received through the receiving antenna 11 from the base station is amplified to a transmission signal with a relatively high power, when the receiving apparatus 100 of the repeater system, where the transmitting apparatus and receiving apparatus coexist, receives the next signal from the base station, the transmission signal (S_Tx) transmitted from the transmitting antenna 24 happens to be inputted to the receiving apparatus. At this time, the transmission signal (S_Tx) has a phase difference in proportion to the distance between the transmitting antenna 24 and the receiving antenna 11, a propagation loss and a gain of the receiving antenna 11.

As a result, due to the transmission signal, the output signal of the band-pass filter 12 includes a frequency component (S_Tx') besides the frequency signal (S_Rx), and the output signal of the mixer 14 includes an intermediate frequency signal (IF_Rx') besides the intermediate frequency signal (IF_Rx). Thus, a base noise is inevitably generated with the output of the of the active devices such as the low-noise amplifier and the frequency mixer 14 which are to receive the frequency component (S_Tx'). Doubtlessly, the noise degrades the performance of the low-noise amplifier and the frequency mixer 14, resulting in degradation of performance of the receiving apparatus.

SUMMARY OF THE INVENTION

Therefore, an object of the present invention is to provide a transmitting/receiving apparatus of a repeater system which is capable of removing a frequency component generated in a receiving apparatus due to a transmission signal to thereby improve performance of a repeater system.

To achieve these and other advantages and in accordance with the purpose of the present invention, as embodied and broadly described herein, there is provided a transmitting apparatus and a receiving apparatus of a repeater system in which a signal received by the receiving apparatus from a base station is amplified to a high-powered transmission signal by the transmitting apparatus so as to be transmitted to a destination, wherein the transmitting apparatus varies a phase and a magnitude of the transmission signal and applies a compensation signal to the receiving apparatus, and the receiving apparatus adds the inputted compensation signal and a signal inputted through a receiving antenna and removes an unnecessary frequency component caused due to interference of the transmission signal.

In order to achieve the above object, the receiving apparatus includes a receiving antenna for receiving a signal propagated from a base station; a band-pass filter for filtering the output of the receiving antenna; an adder for adding the output of the band-pass filter and a compensation signal; a low-noise amplifier for amplifying the output signal of the adder; and a first mixer for mixing a local signal with the output of the low-noise amplifier to convert it to an intermediate frequency signal.

In order to achieve the above object, the transmitting apparatus includes a second mixer for mixing the intermediate frequency signal outputted from the first mixer and a local signal to generate a radio frequency signal; a power amplifier for amplifying the radio frequency signal outputted from the second mixer; a low-pass filter for filtering the output signal of the power amplifier; a transmitting antenna for transmitting the output signal of the low-pass filter toward a destination; a phase converter for converting by ±180° a phase of the signal amplified by the power amplifier; and a variable amplifier for variably amplifying the output signal of the phase converter and generating a compensation signal.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Figure 1:
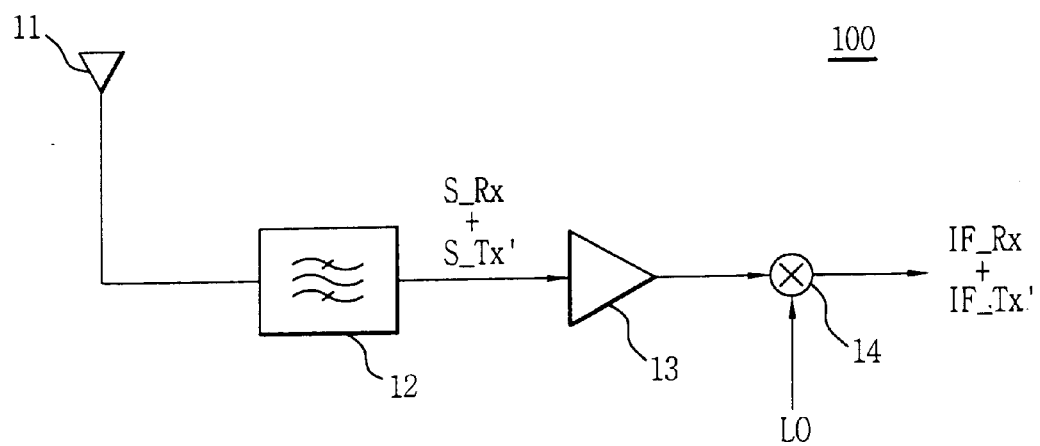
FIG. 1 is a schematic view of a receiving apparatus of a repeater system in accordance with a conventional art.

Reference will now be made in detail to the preferred embodiments of the present invention, examples of which are illustrated in the accompanying drawings.

In the following descriptions for the present invention, the same reference numerals are given to the same elements as those in the conventional art.

Figure 3:
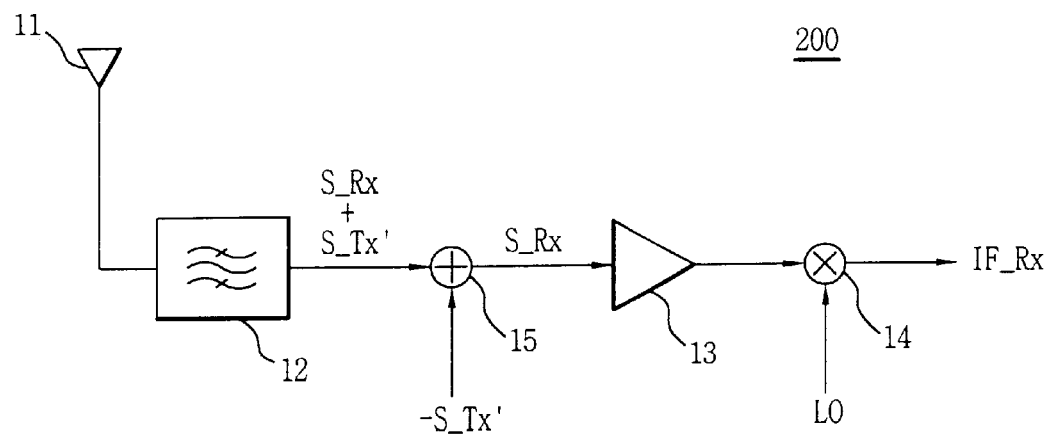
FIG. 3 is a schematic view of a receiving apparatus of a repeater system in accordance with the present invention.

FIG. 3 is a schematic view of a receiving apparatus of a repeater system in accordance with the present invention.

As shown in the drawing, a receiving apparatus 200 of the present invention additionally includes an adder 15 to the conventional receiving apparatus 100 of FIG. 1. The adder 15 is installed to be connected between a band-pass filter 12 and a low-noise amplifier 13, serving to remove a frequency component (S_Tx') caused due to the transmission signal (S_Tx).

Figure 4:
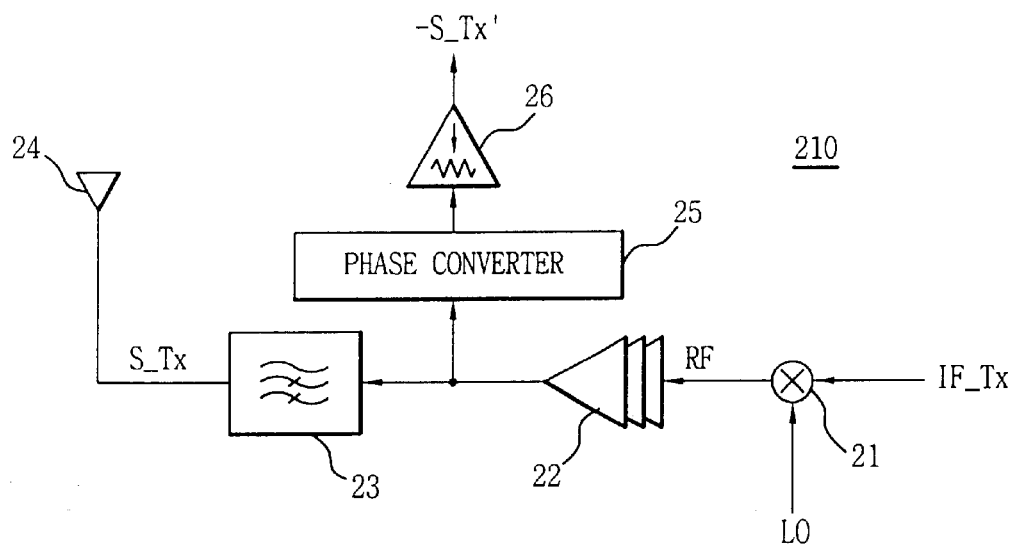
FIG. 4 is a schematic view of a transmitting apparatus of a repeater system in accordance with the present invention.

FIG. 4 is a schematic view of a transmitting apparatus of a repeater system in accordance with the present invention.

Figure 2:
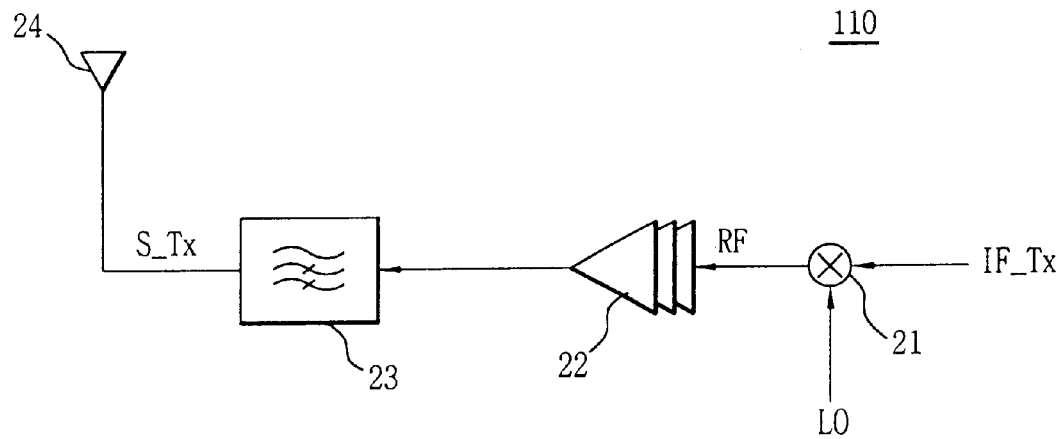
FIG. 2 is a schematic view of a transmitting apparatus of a repeater system in accordance with a conventional art.

As shown in the drawing, a transmitting apparatus 210 of the present invention additionally includes a phase converter 25 and a variable amplifier 26 to the conventional transmitting apparatus 110 of FIG. 2.

A phase converter 25 converts a phase of a signal outputted from a power amplifier 22 by ±180°, and a variable amplifier 26 variably amplifies the output signal of the phase converter 25 to adjust its magnitude, and generates a compensation signal (−S_Tx') having the same magnitude as the frequency component (S_Tx') generated in the receiving apparatus 200.

The operation of the transmitting and receiving apparatuses 200 and 210 of a repeater system constructed as described above will now be explained in detail.

The receiving apparatus 210 of a repeater system processes a signal received from a base station and outputs an intermediate frequency signal (IF_Rx), and the transmitting apparatus 210 thereof processes the intermediate frequency signal (IF_Rx) and externally transmits a transmission signal (S_Tx).

At this time, the phase converter 25 converts the phase of the output signal of the power amplifier 22 by ±180°. That is, the phase converter 25 shifts the phase of the output signal of the power amplifier 22 so as to have ±180° phase difference over the phase variation amount according to a distance (d) between the transmitting antenna 24 and the receiving antenna 11. In this respect, the phase variation amount can be obtained by the following formula (1):

$$\Delta\theta=\beta d=2\pi d/\lambda \qquad (1)$$

Where, $\beta$ indicates a phase constant, and $\lambda$ indicates a wave length.

The variable amplifier 26 amplifies the output signal of the phase converter 25 to have the same gain as that of the frequency component (S_Tx') generated from the receiving apparatus 200. Namely, the variable gain of the power amplifier 22 is obtained by the following formula (2):

$$G=\text{Loss\_propagation loss}+\text{Loss\_Ant\_Isolation}+\text{Loss\_BPF}+\text{Loss\_Coupling}$$

$$G=G_T G_R \times 10\log(\lambda/4\pi d)^2+\text{Loss\_Ant\_Isolation}+\text{Loss\_BPF}+\text{Loss\_Coupling} \qquad (2)$$

Where, $G_T$ indicates a gain of the transmitting antenna 24, and GR indicates a gain of the receiving antenna 11. The Loss_Ant_Isolation is a value determined in designing a system, and Loss_BPF is a value indicating an attenuation degree of the transmission frequency band attenuated by the BPF 12 positioned at the receiving apparatus 200. Also, the Loss_Coupling indicates a coupled amount for sampling a signal in the transmitting apparatus 210. The Loss_Coupling may be adjusted according to a variable gain variation amount of the variable amplifier 26 in a range that does not affect the output of the transmitting signal.

Therefore, the compensation signal (−S_Tx') outputted from the variable amplifier 16 has the same magnitude as that of the frequency component (S_Tx') generated in the receiving apparatus 200 and ±180° different phase to the latter.

Thereafter, when the receiving apparatus 200 of the repeater system receives and processes the next signal from the base station, the adder 15 adds the output signal (S_Rx+S_Tx') of the band-pass filter 12 and the compensation signal (−S_Tx') outputted from the variable amplifier 16 of the receiving apparatus 210. Consequently, as the frequency component (S_Tx') is removed by the adder 15, only the pure frequency signal (S-Rx) is inputted to the low noise amplifier 13.

Accordingly, there is no base noise in the output of the active devices such as the low-noise amplifier 13 and the frequency mixer 14, the receiving capability of the receiving apparatus is improved as a whole.

As so far described, according to the transmitting/receiving apparatus of the repeater system of the present invention, since the transmission signal transmitted from the transmitting apparatus and inputted to the receiving apparatus is appropriately removed, no noise component which is subject to be generated due to the interference of the transmission signal is included. Accordingly, the present invention has an effect that the receiving capability of the repeater system in which the transmitting and receiving apparatuses exist is highly improved.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A repeater system, comprising:
   a receiving apparatus for receiving a signal from a base station; and
   a transmitting apparatus, wherein the transmitting apparatus varies a phase and a magnitude of a power amplified transmission signal to generate a compensation signal and applies the compensation signal to the receiving apparatus, and the receiving apparatus adds the inputted compensation signal and a signal inputted through a receiving antenna and removes an unnecessary frequency component caused due to interference of the transmission signal, wherein the transmitting apparatus comprises:

a mixer for mixing an intermediate frequency signal outputted from the receiving apparatus and a local signal to generate a radio frequency signal;

a power amplifier for amplifying the radio frequency signal outputted from the mixer;

a low-pass filter for filtering the output signal of the power amplifier;

a transmitting antenna for transmitting the output signal of the low-pass filter toward a destination;

a phase converter for converting a phase of the signal amplified by the power amplifier; and a variable amplifier for variably amplifying the output signal of the phase converter so as to adjust the magnitude of the output signal and generating a compensation signal.

2. The system of claim 1, wherein the compensation signal has the same magnitude as that of a noise signal generated due to the transmission signal and ±180° different phase to that of the noise signal.

3. The system of claim 1, wherein the receiving apparatus comprises:

a receiving antenna for receiving a signal propagated from a base station;

a band-pass filter for filtering the output of the receiving antenna;

an adder for adding the output of the band-pass filter and the compensation signal;

a low-noise amplifier for amplifying the output signal of the adder; and a first mixer for mixing a local signal with the output of the low-noise amplifier to convert it to an intermediate frequency signal.

4. The apparatus according to claim 1, wherein the variable amplifier amplifies or attenuates the output signal of the phase converter so that it has the same magnitude as that of the signal outputted from the transmitting apparatus.

5. The system of claim 1, wherein said phase converter converts a phase of the signal amplified by the power amplifier by ±180°.

6. A transmitting/receiving apparatus of a repeater system, comprising:

a receiving antenna for receiving a signal propagated from a base station;

an adder for adding a signal inputted through the receiving antenna and a compensation signal and removing a noise caused due to interference of a transmission signal;

a low-noise amplifier for amplifying the output signal of the adder;

a first mixer for mixing the output of the low-noise amplifier and a local signal to obtain a converted intermediate frequency signal; and a transmitting apparatus for processing the intermediate frequency signal outputted from the first mixer and outputting a transmission signal and the compensation signal, wherein the compensation signal is generated by the transmitting apparatus by varying a phase and magnitude of a power amplified signal, wherein the transmitting apparatus comprises:

a second mixer for mixing the intermediate frequency signal and a local signal to generate a radio frequency signal;

a power amplifier for amplifying the radio frequency signal outputted from the second mixer;

a low-pass filter for filtering the output signal of the power amplifier;

a transmitting antenna for transmitting the output signal of the low-pass filter to a destination;

a phase converter for converting a phase of the signal amplified by the power amplifier; and a variable amplifier for variably amplifying the output signal of the phase converter and generating a compensation signal.

7. The apparatus according to claim 6, wherein the signal inputted to the receiving antenna includes the signal propagated from the base station and a noise signal outputted from the transmitting apparatus.

8. The apparatus according to claim 6, wherein the compensation signal has the same magnitude as that of the noise signal generated due to the transmitting signal and ±180° different phase to that of the noise signal.

9. The apparatus according to claim 6, further comprising a band-pass filter for filtering the received signal by means of the receiving antenna and providing it to one input of the adder.

10. The apparatus according to claim 6, wherein said phase converter converts a phase of the signal amplified by the power amplifier by ±180°.

11. A transmitting/receiving apparatus of a repeater system, comprising:

a low-noise amplifier for amplifying an output signal of an adder;

a first mixer for mixing the output of the low-noise amplifier and a local signal to obtain a converted intermediate frequency signal;

a second mixer for mixing the intermediate frequency signal outputted from the first mixer and a local signal;

a power amplifier for amplifying a radio frequency signal outputted from the second mixer;

a low-pass filter for filtering the output signal of the power amplifier;

a transmitting antenna for transmitting the output signal of the low-pass filter toward a destination;

a phase converter for converting a phase of the signal amplified by the power amplifier; and a variable amplifier for variably amplifying the output signal of the phase converter and outputting a compensation signal to the adder.

12. The apparatus according to claim 11, wherein a signal inputted to the adder includes a signal propagated from a base station and a noise signal outputted from the transmitting antenna.

13. The apparatus according to claim 12, wherein the compensation signal has the same magnitude as that of the noise signal outputted from the transmitting antenna and ±180° different phase to that of the noise signal.

14. The apparatus according to claim 12, wherein the compensation s signal has the same magnitude as that of a transmission signal transmitted from the transmitting antenna and ±180° different phase to that of the transmission signal.

15. The apparatus according to claim 11, wherein the phase converter converts the phase of the output signal of the power amplifier by ±180°.

16. A repeater system, comprising:

a receiver for receiving an input signal, adding a compensation signal to the input signal and outputting a processed signal; and a transmitter for receiving the processed signal from the receiver, and for power amplifying the processed signal to yield a transmission signal, wherein the transmitter also varies a phase and magnitude of the power amplified processed signal to generate the compensation signal, wherein the transmitter comprises:

a mixer for mixing the processed signal from the receiver with a local signal;

a power amplifier for amplifying a signal output by the mixer and outputting a power amplified transmission signal;

a low-pass filter for filtering the power amplified transmission signal and outputting a filtered transmission signal;

a transmitting antenna for transmitting the filtered transmission signal;

a phase converter for converting a phase of the power amplified transmission signal and outputting a phase converted signal; and a variable amplifier for varying a magnitude of the phase converted signal to yield the compensation signal.

17. The repeater system of claim 16, wherein the receiver comprises:

a receiving antenna for receiving the input signal;

an adder for adding the input signal and the compensation signal and outputting an adder signal;

a low noise amplifier for amplifying the adder signal and outputting an amplified adder signal; and a mixer for mixing a local signal with the amplified adder signal to yield the processed signal.

18. The repeater system of claim 17, wherein the processed signal comprises an intermediate frequency signal.

19. The repeater of claim 16, wherein the processed signal comprises an intermediate frequency signal and the signal output by the mixer comprises a radio frequency signal.

* * * * *